Aug. 14, 1956   E. C. ELSNER   2,758,867
CARGO HOOK
Filed Jan. 19, 1953   2 Sheets-Sheet 1
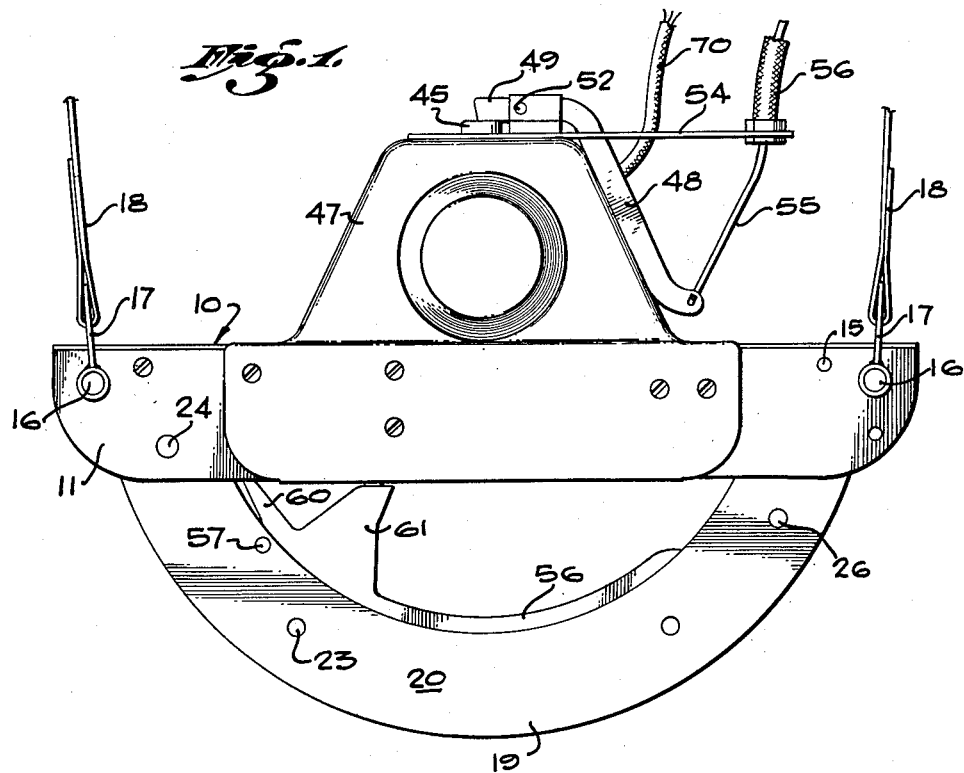
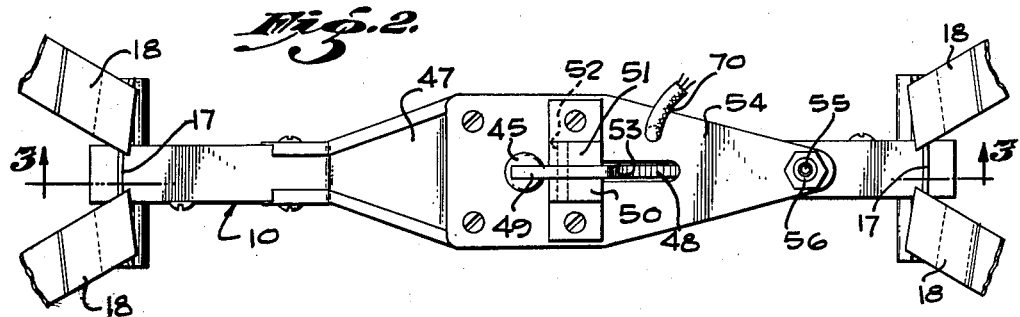
Edwin C. Elsner,
INVENTOR.
BY
ATTORNEY Aug. 14, 1956  E. C. ELSNER  2,758,867
CARGO HOOK
Filed Jan. 19, 1953  2 Sheets-Sheet 2
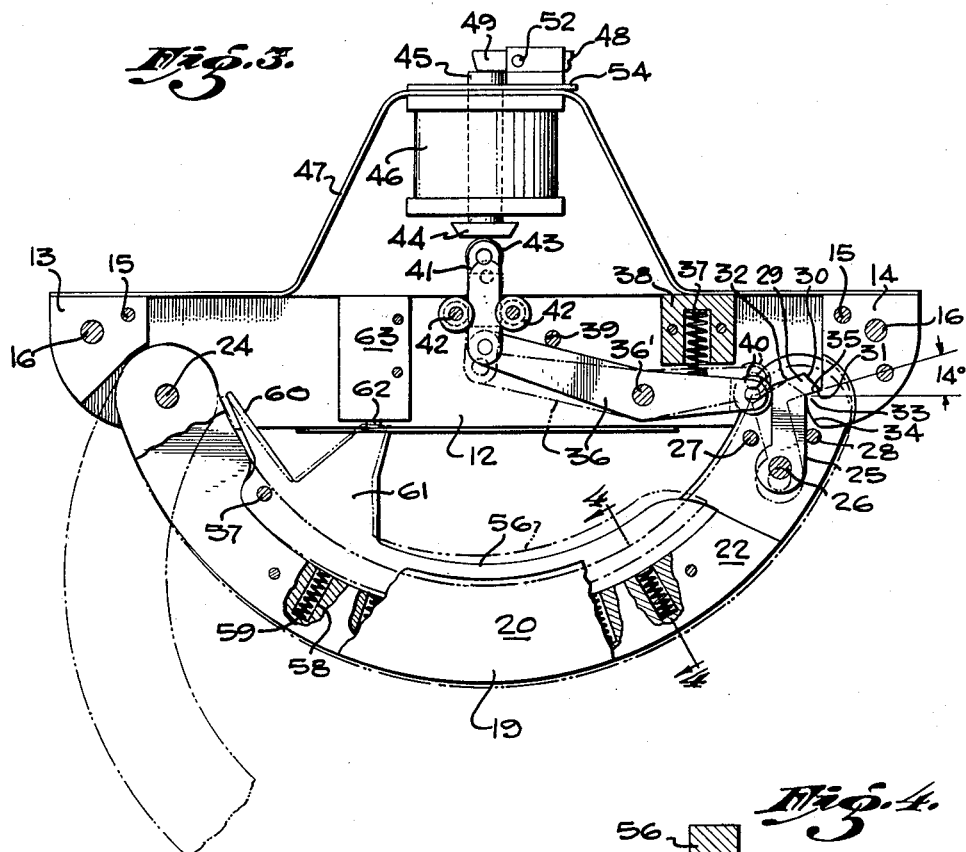
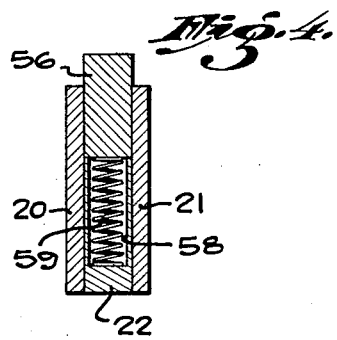
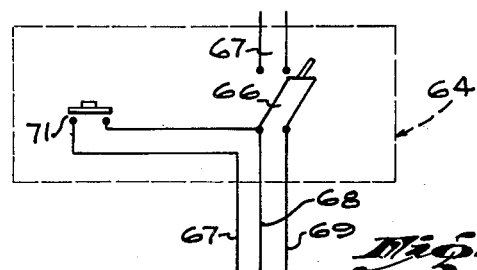
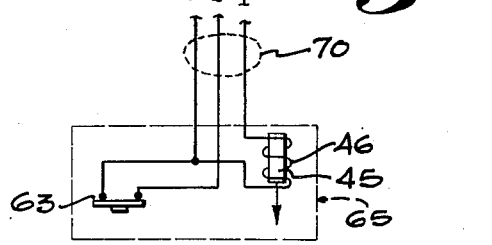
EDWIN C. ELSNER,
INVENTOR.
BY
ATTORNEY

United States Patent Office 2,758,867
Patented Aug. 14, 1956

2,758,867

CARGO HOOK

Edwin C. Elsner, Glendale, Calif., assignor to General Logistics, Pasadena, Calif., a corporation of California Application January 19, 1953, Serial No. 332,047

13 Claims. (Cl. 294—83)

The present invention relates generally to apparatus for the handling of cargo and the like, and is more particularly concerned with an improved cargo hook construction.

The invention finds particular use in connection with aircraft and provides a novel and improved device by which cargo, freight, supplies, packages, boxes and other materials may be transported by being suspended below the underbody of aircraft, such as a helicopter, and delivered by landing the craft or by dropping from the craft while still airborne. The latter type of delivery may be accomplished by means of parachutes or other suitable devices.

Considering the invention in its broad concept, it is one object to provide a cargo hook having a releasable latching mechanism which is susceptible of being positively locked against opening, and yet may be readily released by the application of finger tip pressures, even though loads of relatively large weights are being carried by the hook.

A further object of the herein described invention is to provide in a cargo hook, novel electro-magnetic means for actuating the release mechanism, and which is controlled through an energizing circuit having a plurality of control switches. One of these switches is arranged for pilot actuation, while another is load responsive, and arranged to release the load quickly upon withdrawal of the load forces, as may occur during landing. Further provision is also contemplated for manual release by the pilot, independently of the electromagnetic release mechanism.

It is also an object to provide a cargo hook which is of simple construction; which is strong and rugged and adapted to carry extremely high loads; which is foolproof; and which is well adapted for the purposes described herein.

While the cargo hook of the present invention will be hereinafter described in particular with reference to its utilization in connection with the transportation of cargo by suspending below an aircraft, it is contemplated in its broad field of application that the construction is also susceptible of use for suspending cargoes from parachutes, and in releasing these cargoes as soon as the cargo strikes the ground.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a side elevational view of a cargo hook embodying the features of the herein described invention;

Fig. 2 is a plan view of the same;

Fig. 3 is a longitudinal sectional view, taken substantially on line 3—3 of Fig. 2, and having cutaway portions to show specific details of construction;

Fig. 4 is a transverse sectional view through the hook member, taken substantially on line 4—4 of Fig. 3; and Fig. 5 is a circuit wiring diagram for controlling the actuation of the electro-magnetic releasing mechanism.

Referring generally to the drawings, for illustrative purposes the cargo hook of the present invention is disclosed as comprising an elongate frame structure 10 which is fabricated with a pair of side rails 11 and 12 being held in parallel spaced relation by spacing end blocks 13 and 14 with associated conventional securing members 15 which may be rivets, bolts or other conventional means.

Provision is made for supporting the frame structure and associated parts to be hereinafter described below the underbody of a helicopter or other aircraft. Mounted in each of the end blocks is a pin 16 with its ends respectively projecting beyond the side rails of the frame structure to form a securement for an associated shackle member 17 which straddles the associated end of the frame structure and has limited swinging movement about the pin. These shackles are shown in Figs. 1 and 2 as being incorporated in attaching means by which suspension members such as the webbing 18 may be attached to the device. While webbing has been shown, it is contemplated that other types of suspension members may be utilized, such as cable or the like, if desired.

A hook 19 is swingably supported and operatively associated with the frame structure. This hook, as shown in Figs. 3 and 4 may be variously constructed. In the present instance it is shown as comprising a pair of arcuate side members 20 and 21 which are secured to an arcuate spacing block 22 by means of suitable rivets 23 or other appropriate securing members. The hook 19 is pivoted at one end in the frame structure for swinging movement on a pivot pin 24 into closed and open hook positions.

The free end of the hook 19 carries between the adjacent side members 20 and 21 a latch member 25 which is pivoted at one end on a pivot pin 26 for swinging movement between limiting positions defined by stop pins 27 and 28. As shown in Fig. 3, the latch member 25 at its free end is provided with an angular projection 29 having converging edge portions 30 and 31 which form camming surfaces for a purpose to be hereinafter explained. As shown, the edge 31 is so constructed as to form an angle of substantially 14 degrees with the horizontal, as shown, when the latch member is in closed position. Further, the free end of the latch member has an end edge 32 which is in converging relation with the edge 30 and likewise forms a cam surface for a purpose to be subsequently explained.

The end block 14 is utilized as a retaining member for the cooperative association with the latch member 25, and is provided with a projection 33 defined by a curved edge 34 and a straight edge 35. In the closed position of the hook 19, it will be observed that the latch member 25 in latching position has its projection 29 overlying the projection 33, and that the endmost portions of the side members 20 and 21 extend between the side rails 11 and 12 of the frame structure so that the hook is effectively anchored and held at its free end against movement in closed position.

Means are provided for positively locking the latch member 25 in latching position. For this purpose there is provided a locking bar 36 which is supported between its ends upon a pivot pin 36' for rocking movements. The locking bar is normally biased for movement in a clockwise direction by means of a coiled spring 37 which is supported in a block 38 with one end bearing against the associated locking bar. Movement in clockwise direction is limited by a stop pin 39 at a position which constitutes the locking position of the locking bar, and which is shown in full lines in Fig. 3. The end of the locking bar which is adjacent the latch member 25 carries a roller 40 which is arranged to seat behind the latch member and oppose its movement to nonlatching position. It will be observed that in the locking position of the locking bar, the axis of rotation of the roller 40 and the axis of the pivot pin 36' lie in a plane which passes through the lowermost point of engagement of the edges 31 and 35, and that the point of contact of the roller with the latch member is only slightly positioned below the lowest point of the edge 32. Only slight movement of the locking bar against the biasing spring 37 is required, therefore, to release the latch member 25 for movement to non-latching position.

At the opposite end of the locking bar, the bar is pivotally connected to a link member 41 which is reciprocably supported for movement between laterally positioned edge engaging guide rollers 42 which substantially constrain the movement of the link in a lengthwise direction but permit a slight canting thereof due to the arcuate movement of its pivotal connection with the associated end of the locking bar. The free end of the link 41 carries a roller 43 which is arranged to bear against an enlarged head portion 44 of a solenoid plunger 45 operatively associated with a solenoid coil 46 of electro-magnetic means for actuating the locking mechanism, this portion of the apparatus being contained within a suitable enclosing housing 47. The plunger 45 is adapted upon energization of the coil 46 to move downwardly and actuate the locking bar to nonlocking position as shown in dotted lines.

Provision is also made for manually moving the locking bar to nonlocking position. This is accomplished by providing exteriorly of the housing 47 a lever 48 which has a deflected end portion 49 pivotally supported in spaced lugs 50 and 51 by pivot pin 52. The lever 48 has its end portion 49 extending over a projecting end of the plunger 45 and its opposite end extending through an opening 53 of a plate member 54 so as to be carried downwardly along the side of the housing 47. This end of the lever 48 is connected to a flexible cable 55 which is carried upwardly through a flexible conduit 56 having its adjacent end anchored to the plate 54. The cable 55 is carried to a position where it may be actuated by the pilot or other person in the aircraft. By exerting a pulling force on the cable, the lever 48 may be swung in a counterclockwise direction to move the plunger 45 downwardly and thus actuate the locking bar to nonlocking position.

Provision is made also for controlling the energization of the coil 46 by the operator of the aircraft, as will hereinafter be explained more fully. However, provision must also be made in a device of this character for releasing the load carried by the hook in the event that the aircraft descends sufficiently low that the cargo will contact the ground. Such release must be quickly and positively accomplished in order to enable the aircraft to be landed. For such purpose, the hook is provided with an arcuate trigger 56 which is positioned between the upper edge margins of the side members 20 and 21 of the hook, it being observed that the spacing block 22 is made of less height than the side members so as to leave a space for the trigger member. The trigger is pivoted at one end for limited swinging movement on a pivot pin 57. As shown in Figs. 3 and 4, the block 22 is provided with a plurality of spaced recesses 58 which open into its upper edge and form receivers for coiled springs 59 having their outer ends in engagement with the associated edge of the trigger 56 so as to bias the trigger for movement about its pivot 57 in a counterclockwise direction to a position as shown in dotted lines wherein a projecting end finger 60 abuts an adjacent portion of the hook to limit this biased movement.

Normally, the load forces of a load carried by the hook operate to hold the trigger 56 in depressed position as shown in full lines in Fig. 3. However, immediately upon withdrawal of the load forces, the springs 59 act to raise the trigger and in so doing move a projection 61 so as to bring an end portion thereof into contact with an actuating button 62 of a control switch 63 mounted in the space between the side rails 11 and 12 of the frame structure. This movement of the trigger causes the switch 63 to close its contacts and energize the coil 46 so as to actuate the locking bar to nonlocking position and thus release the latch and permit swinging of the hook 19 to open position in which it will release the cargo.

The operation of the latch member and locking bar during closing and opening of the hook 19 will now be explained in detail. During closing of the hook, and as its free end approaches closed position, the latch member 25 will be swung in a counterclockwise direction until it strikes the stop pin 27 as a result of the edge 30 of the latch member engaging against the edge 34 and the camming action which ensues. In this position of the latch member, it will be observed that the edge 32 of the latch member, upon further closing movement of the hook, will be engaged by the roller 40 so that the locking bar 36 will be moved in a counterclockwise direction against its biasing spring 37. As soon however as the closing movement has proceeded sufficiently to permit the point of the projection 29 to clear the edge 35, the latch member 25 will be forced to move towards latching position in a clockwise direction by the camming action of the cam surface defined by edge 32. Now, when the latch member reaches fully latched position, the roller 40 is released so that it may be moved behind the latch member as a consequence of a clockwise rotation of the locking bar by its biasing spring 37. The locking bar therefore positively locks the latch member against movement to a released position until the roller 40 is moved from behind the latch member.

As previously explained, the locking bar may be moved to nonlocking position by energizing the coil 46 of the electro-magnetic means or manually by pulling on the cable 55. In either case, slight movement of the locking bar in a counterclockwise direction operates to move the roller from a substantially dead center position to a point where the latch member may swing in a counterclockwise direction. This unlatching of the latch member results from the pull exerted by the load on the hook and the ensuing camming action between the camming surfaces of edges 31 and 35. As soon as the projection 29 clears the projection 33, the hook is free to move to open position.

Referring to Fig. 5, the control circuit will now be described. In this view, the aircraft cabin or compartment is schematically indicated by the numeral 64 while the hook is generally indicated by the numeral 65. As shown, a main line switch 66 is utilized for connecting a suitable electrical source 67 with a control circuit for the coil 46 which includes the conductors 67, 68 and 69 which are carried through a suitable conduit or take the form of a multi-conductor cable 70. The switch 63 is positioned in the hook assembly while a switch 71 having normally open contacts is positioned in the cabin for pilot control. The contacts of switch 63 are normally closed, when there is no load on the hook.

When it is desired to utilize the hook of the present invention for the transportation of a cargo, the main switch 66 is left in open position until the aircraft is airborne. The main switch 66 may then be closed, and since the contacts of both switches 63 and 71 are open, the coil 46 will not be energized. Should it be desired to release the cargo, the pilot may do this at any time by the manual operation of pulling on the cable 55, or electrically by closing the contacts of switch 71 which will energize the coil 46 through the following circuit: from one side of the electrical source, through conductor 69 to one side of the coil 46, from the other side of the coil 46 through conductor 67, the contacts of switch 71, and thence back to the other side of the electrical source.

Should it be desired to have the hook open automatically as soon as the cargo touches the ground, this will be accomplished through the actuation of the switch 63.

As soon as the load forces are withdrawn from the hook, the springs 59 will activate the trigger 56 to close the contacts of switch 63. This will energize the coil 46 through the following circuit: from one side of the electrical source through conductor 69 to one side of the coil 46, from the other side of the coil 46 through the contacts of switch 63, and thence through conductor 68 back to the other side of the electrical source. The control just described constitutes an extremely flexible arrangement for controlling the cargo release under the required conditions of operation.

Various modifications may suggest themselves to those skilled in the art without departing from the spirit of my invention, and, hence, I do not wish to be restricted to the specific form shown or uses mentioned, except to the extent indicated in the appended claims.

I claim:

1. In a device of the character described, the combination comprising: a frame structure; a hook member pivoted at one end in said frame structure for swinging movements to open or closed positions; latch means for releasably securing the hook member in its closed position; a locking bar pivoted for swinging movements to locking and nonlocking positions with respect to said latch means; means normally biasing the locking bar to its locking position; a solenoid coil and associated plunger operable upon coil energization to move the locking bar to its nonlocking position; a trigger member carried by said hook mounted for movement in one direction by load forces set up by a load on said hook; means biasing said trigger member in an opposite direction; and a control switch operable by the biased movement of said trigger member to energize said coil upon withdrawal of the load forces.

2. In a device of the character described, the combination comprising: a frame structure; a hook member pivoted at one end in said frame structure for swinging movements to open or closed positions; latch means for releasably securing the hook member in its closed position; a locking bar pivoted for swinging movements to locking and nonlocking positions with respect to said latch means; means normally biasing the locking bar to its locking position; a solenoid coil and associated plunger operable upon coil energization to move the locking bar to its nonlocking position; and a control switch for said coil operable upon withdrawal of an applied hook load force to energize said coil.

3. In a device of the character described, the combination comprising: a frame structure; a hook member pivoted at one end in said frame structure for swinging movements to open or closed positions; latch means for releasably securing the hook member in its closed position; a solenoid having a plunger operatively associated with said latch means, said solenoid being energizable in response to a predetermined hook load condition to release said latch means; and means for manually moving said plunger to actuate the latch means.

4. In a device of the character described, the combination comprising: a frame structure; a hook member pivoted at one end in said frame structure for swinging movements to open or closed positions; means for latching the free end of said hook member in closed position; latch locking and releasing means including electro-magnetic means energizable to release said latch; control means for energizing said electro-magnetic means including a switch responsive to a hook load condition; and means for manually actuating said latch locking and releasing means to release said latch independently of the energization of said electro-magnetic means.

5. In a device of the character described, the combination comprising: a frame structure; a hook member pivoted at one end in said frame structure for swinging movements to open or closed positions; latch means for interconnecting the frame structure and free end of the hook member in its closed position; electro-magnetic means energizable to release said latch including an energizing circuit; and means for controlling said circuit including a member movable in response to the application and withdrawal of load forces on said hook.

6. In a device of the character described, the combination comprising: a frame structure; a load supporting hook member extending below said frame structure and being pivoted at one end in said frame structure for swinging movements to open or closed positions with the frame structure adapted to bridge the hook ends in the closed position, latch means to interconnect the frame structure and free end of the hook member in its closed position; and means to release said latch in response to withdrawal of a suspended load pressure acting on said hook, said means including a trigger member carried by said hook member.

7. In a device of the character described, the combination comprising: a frame structure; a hook member pivoted at one end in said frame structure for swinging movements to open or closed positions; members carried by said frame structure and the free end of said hook having latching engagement to releasably secure the hook in closed position; a locking bar pivoted between its ends for rocking movement, one end in locking position being disposed to oppose disengagement of said latching members; means biasing said locking bar toward a locking position; a link pivotally connected to the other end of said locking bar supported for longitudinal guided movement; solenoid means including a plunger operable upon energization to move said link in a direction to rock the locking bar in an opposite direction to its biasing means and move it to a nonlocking position with respect to said latching members; and a manually operable lever for moving said locking bar to nonlocking position independently of said solenoid means energization.

8. In a device of the character described, the combination comprising: a frame structure; a hook member pivoted at one end in said frame structure for swinging movements to open or closed positions; members carried by said frame structure and hook having latching engagement to releasably secure the hook in closed position; a locking bar pivoted between its ends for rocking movement, one end in locking position being disposed to oppose disengagement of said latching members; means biasing said locking bar towards a locking position; a link pivotally connected to the other end of said locking bar supported for longitudinal guided movement; and solenoid means including a plunger operable upon energization to move said link in a direction to rock the locking bar in an opposite direction to its biasing means and move it to a nonlocking position with respect to said latching members.

9. In a device of the character described, the combination comprising: a frame structure; a hook member pivoted at one end in said frame structure for swinging movements to open or closed positions; a pivoted latch member; a retaining member adapted to be engaged by the latch member in its latching position, upon the hook being moved to fully closed position; a movably mounted locking member; means biasing said locking member towards a locking position opposing movement of said latch member to a nonlatching position; and cam surfaces arranged to coact between said latch member and said locking member during hook closing to move said latch member towards a latching position and enable movement of the locking member by said biasing means to a locking position.

10. In a device of the character described, the combination comprising: a frame structure; a hook member pivoted at one end in said frame structure for swinging movements to open or closed positions; a pivoted latch member; a retaining member adapted to be engaged by the latch member in its latching position, upon the hook being moved to fully closed position; a movably mounted locking member; means biasing said locking member towards a locking position opposing movement of said latch member to a nonlatching position; means for actuating the locking member to nonlocking position; and cam surfaces arranged to coact between said latch member and said retaining member under hook opening forces to move the latch member to nonlatching position, when the locking member is moved to a nonlocking position.

11. In a device of the character described, the combination comprising: a frame structure; a hook member pivoted at one end in said frame structure for swinging movements to open or closed positions; a pivoted latch member; a retaining member adapted to be engaged by the latch member in its latching position, upon the hook being moved to fully closed position; a movably mounted locking member; means biasing said locking member towards a locking position; a camming surface operable upon engagement of the retaining member and latch member to initially swing the latch member into a position for engaging and moving said locking member against said biasing means; and a camming surface on said latch member operative during engagement with said locking member to move the latching member to latching position so as to release the locking member for biased movement to a position opposing reversed movement of the latching member to nonlatching position; and means for moving the locking member to a nonlocking position.

12. In a device of the character described, the combination comprising: a frame, a hook pivotally carried at one end of the frame for swinging movement between open or closed positions; latch means carried by the frame releasably securing said hook member in closed position; a locking member carried by the frame and mounted to move between locking and releasing positions with respect to the latch means; means normally biasing the locking member to latch-locking position; a solenoid having an energizable coil and a plunger movable by the coil, when energized; said plunger being operatively engaged with the locking member to move the same to latch-releasing position when the coil is energized; a trigger member carried by said hook mounted for movement in one direction by load forces set up by a load on said hook; means biasing said trigger member in an opposite direction; and a control switch operable by the biased movement of said trigger member to energize said coil upon withdrawal of the load forces.

13. In a device of the character described, the combination comprising: a frame, a hook pivotally carried at one end of the frame for swinging movement between open or closed position; latch means carried by the frame releasably securing said hook member in closed position; a locking member carried by the frame and mounted to move between locking and releasing positions with respect to the latch means; means normally biasing the locking member to latch-locking position; a solenoid having an energizable coil and a plunger movable by the coil, when energized; said plunger being operatively engaged with the locking member to move the same to latch-releasing position when the coil is energized; and a control switch for said solenoid coil operable upon withdrawal of an applied hook force to energize said coil.

References Cited in the file of this patent

UNITED STATES PATENTS

| | | |
|---|---|---|
| 1,111,338 | Watson | Sept. 22, 1914 |
| 1,297,300 | Preisler | Mar. 11, 1919 |
| 1,839,389 | Heppenstall | Jan. 5, 1932 |
| 1,980,375 | Bradshaw | Nov. 13, 1934 |
| 2,087,877 | Ralston et al. | July 20, 1937 |
| 2,381,045 | Gammel | Aug. 7, 1945 |
| 2,395,164 | Cole | Feb. 19, 1946 |
| 2,521,516 | Heidman et al. | Sept. 5, 1950 |

FOREIGN PATENTS

| | | |
|---|---|---|
| 285,376 | Great Britain | May 31, 1928 |
| 368,699 | Great Britain | Sept. 6, 1930 |